United States Patent
Kia et al.

(10) Patent No.: US 10,493,705 B2
(45) Date of Patent: Dec. 3, 2019

(54) ADDITIVE MANUFACTURING OF A BODY COMPONENT ON A TUBE FRAME

(71) Applicant: GM Global Technology Operations LLC, Detroit, MI (US)

(72) Inventors: Hamid G. Kia, Bloomfield Hills, MI (US); Jorge F. Arinez, Rochester Hills, MI (US); John P. Spicer, Plymouth, MI (US); Ningjian Huang, Bingham Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 941 days.

(21) Appl. No.: 14/940,937

(22) Filed: Nov. 13, 2015

(65) Prior Publication Data

US 2017/0136698 A1    May 18, 2017

(51) Int. Cl.
*B33Y 10/00* (2015.01)
*B29D 99/00* (2010.01)
*B29C 65/00* (2006.01)
*B29C 70/86* (2006.01)
*B29C 64/106* (2017.01)
(Continued)

(52) U.S. Cl.
CPC .......... *B29C 70/86* (2013.01); *B29C 64/106* (2017.08); *B29C 65/00* (2013.01); *B29C 66/00* (2013.01); *B29D 99/001* (2013.01); *B29L 2007/002* (2013.01); *B32B 2605/00* (2013.01); *B33Y 10/00* (2014.12); *B33Y 30/00* (2014.12)

(58) Field of Classification Search
None
See application file for complete search history.

(56) References Cited

U.S. PATENT DOCUMENTS 5,264,059 A * 11/1993 Jacaruso ............... B29C 65/342
                                                        156/148
9,358,764 B2    6/2016 Prebil et al.
(Continued)

FOREIGN PATENT DOCUMENTS

CN    104229156 A    12/2014
CN    104708890 A    6/2015
(Continued)

OTHER PUBLICATIONS

First Office Action and Search Report for corresponding Chinese Application No. 201610976212.2 dated May 25, 2018 and correspondence dated May 31, 2018 from China Patent Agent (H.K.) Ltd. summarizing contents; 12 pages.

*Primary Examiner* — Jeffrey M Wollschlager
*Assistant Examiner* — Armand Melendez
(74) *Attorney, Agent, or Firm* — Harness, Dickey & Pierce, P.L.C.

(57) ABSTRACT

Methods and devices for manufacturing paneled structures are provided. The methods include manufacturing a frame structure by additive manufacturing methods and scanning a surface of the frame structure to determine whether there is more than a nominal surface deviation at a location where a panel will be disposed. When there is more than a nominal surface deviation, the methods also include generating a panel to be disposed at the location of the frame structure, wherein the panel has an engagement surface that is complimentary to the surface deviation.

14 Claims, 13 Drawing Sheets

(51) Int. Cl.
 *B33Y 30/00* (2015.01)
 *B29L 7/00* (2006.01)

(56) References Cited

U.S. PATENT DOCUMENTS

| | | | |
|---|---|---|---|
| 2004/0236454 A1* | 11/2004 | Weisser | B29C 65/52 700/123 |
| 2014/0300017 A1* | 10/2014 | Wighton | B33Y 50/00 264/40.1 |
| 2014/0328964 A1 | 11/2014 | Mark et al. | |
| 2014/0367519 A1* | 12/2014 | Goehlich | B64C 1/00 244/119 |
| 2015/0076732 A1* | 3/2015 | Kemmer | B29C 64/106 264/255 |
| 2015/0202824 A1 | 7/2015 | De Mattia | |
| 2017/0136697 A1 | 5/2017 | Kia et al. | |
| 2017/0211168 A1 | 7/2017 | Liu et al. | |
| 2018/0216501 A1 | 8/2018 | Brown et al. | |
| 2018/0216658 A1 | 8/2018 | Brown et al. | |

FOREIGN PATENT DOCUMENTS

| | | |
|---|---|---|
| CN | 104787299 A | 7/2015 |
| CN | 104972677 A | 10/2015 |
| CN | 106696248 A | 5/2017 |
| DE | 102016121007 A1 | 5/2017 |

\* cited by examiner

ADDITIVE MANUFACTURING OF A BODY COMPONENT ON A TUBE FRAME

FIELD

The present disclosure relates to the production of tube frame structures by additive manufacturing.

BACKGROUND

This section provides background information related to the present disclosure which is not necessarily prior art.

Processes for manufacturing devices and vehicles typically rely on independently producing individual parts and piecing or assembling them together to generate a final product. For example, in the automotive industry automobiles are typically manufactured by assembling thousands of individual parts or units to form the vehicle. These parts or units are individually manufactured, often requiring use specialized or complex tools or equipment. Accordingly, the process for manufacturing automobiles is labor intensive, complex, and expensive. For example, automotive plants involve complex systems and operations, including complex tooling, material handling conveyors, stamping tools, body shops, paint shops, and the like. Furthermore, these parts and processes are largely vehicle dependent. Therefore, launching or changing over to the production of a new vehicle requires a long lead time. Accordingly, improved manufacturing methods are needed to streamline the manufacturing processes for automobiles and other vehicles or devices.

SUMMARY

This section provides a general summary of the disclosure, and is not a comprehensive disclosure of its full scope or all of its features.

The present technology provides a method for manufacturing a paneled structure. The method includes scanning an outer surface of a frame structure, and generating a panel via additive manufacturing to be disposed along a first region of the outer surface of the frame structure. The panel has an engagement surface that is complimentary to the first region of the outer surface of the frame structure. The method also includes assembling the panel to the first region of the outer surface of the frame structure to form the paneled structure.

The present technology also provides another method for manufacturing a paneled structure. The method includes scanning an outer surface of a frame structure, and comparing a first region of the scanned outer surface of the frame structure to a second region of a complementary panel to determine if the outer surface of the frame structure has more than a nominal surface deviation at a location where the first region and the second region will be joined. The method also includes generating a corrective component to be disposed at the location if the first region of the outer surface of the frame structure has more than a nominal surface deviation from the second region. The corrective component has an engagement surface that is complimentary to the first region and the second region. Then, the corrective component can be assembled between the first region of the outer surface of the frame structure and the second region of the complementary panel to form the paneled structure.

Additionally, the present technology provides a device for scanning and coating a frame structure. The device includes a track system. A printing head for depositing a resin in a predetermined shape is associated with the track system. A fiber head for depositing fibers onto the resin is also associated with the track system. The track system independently moves the printing head and the fiber head in three dimensions Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 15:
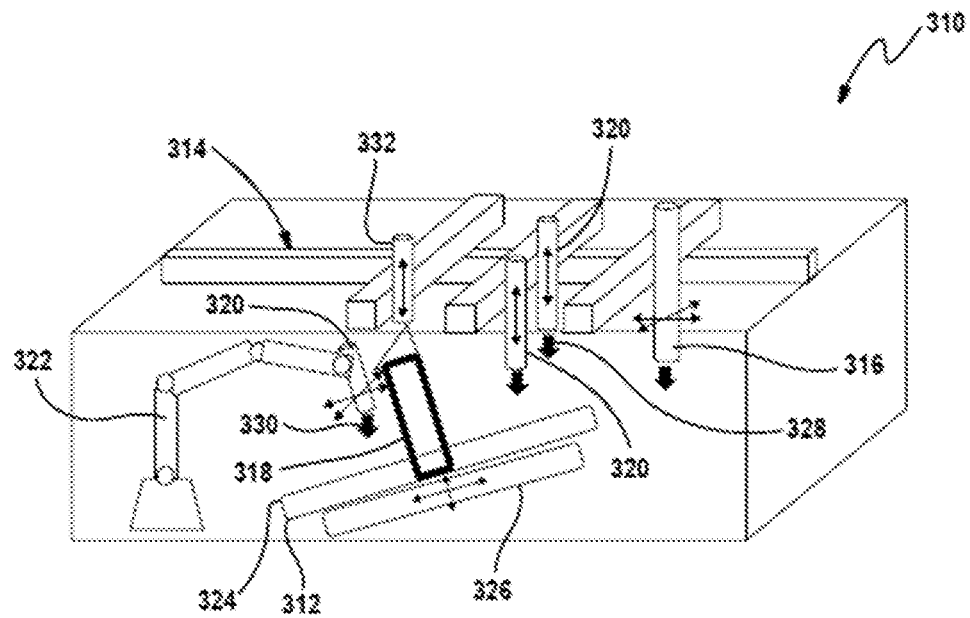
Figure 16:
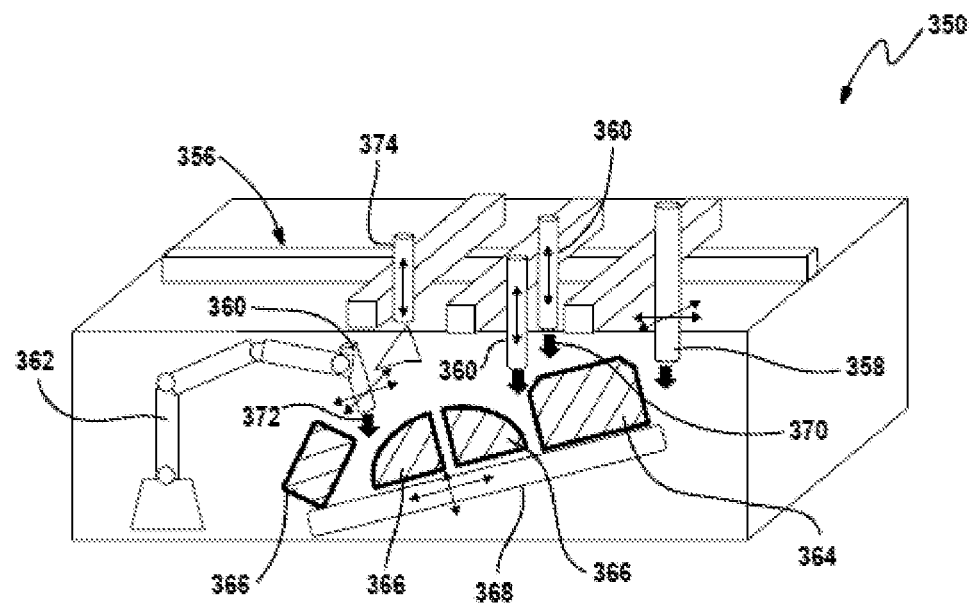

FIG. 15 is an illustration of a device for printing a frame structure, coating the frame structure with a reinforcement material, and scanning a frame structure coated with a reinforcing material according to other aspects of the present technology; and FIG. 16 is an illustration of a device for printing a panel, and coating the panel with a reinforcing material according to certain variations of the present technology.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

In various aspects, the present disclosure provides methods for improving manufacturing processes for forming paneled structures. As described above, current processes for manufacturing vehicles are complex, expensive, and specialized for individual vehicles. Accordingly, the present technology provides methods for additive manufacturing at least one of a structure's space frame or tube frame and body panels or closures. These additive manufacturing methods eliminate customize tooling for body manufacturing and ensure ultra-light-weight structures. While the paneled structures provided by the present technology are particularly suitable for use in components of an automobile or other vehicles (e.g., motorcycles, boats, tractors, buses, motorcycles, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, farm equipment, or heavy machinery, by way of non-limiting example. Accordingly, in certain embodiments, the structure is a vehicle panel assembly. In regard to the automotive industry, the additive manufacturing methods also decrease lead times for launching new vehicles and for changing over to the production of a new vehicle body style, and provide an ability to build vehicle bodies and panels or closures where they are sold. Additional advantages provided by the current technology include faster product development cycles, elimination of style-specific tooling for manufacturing a particular vehicle body, and increased manufacturing flexibility and responsiveness to customer demand. This technology can be used to improve the manufacture of any structure having a frame and panels or closures.

The present disclosure further provides systems and devices for additive manufacturing of structures with panels or closures. Additive manufacturing includes three-dimensional printing and other manufacturing techniques for building a three-dimensional structure layer-by-layer. These systems include scanners that survey a structure's surface and develop a three-dimensional map of the structure's surface geometry. The system also provides a plurality of heads for depositing resins and/or fibers on structure surfaces. In various embodiments, the system is provided as a plurality of devices or as a single multi-functional device.

Figure 1:
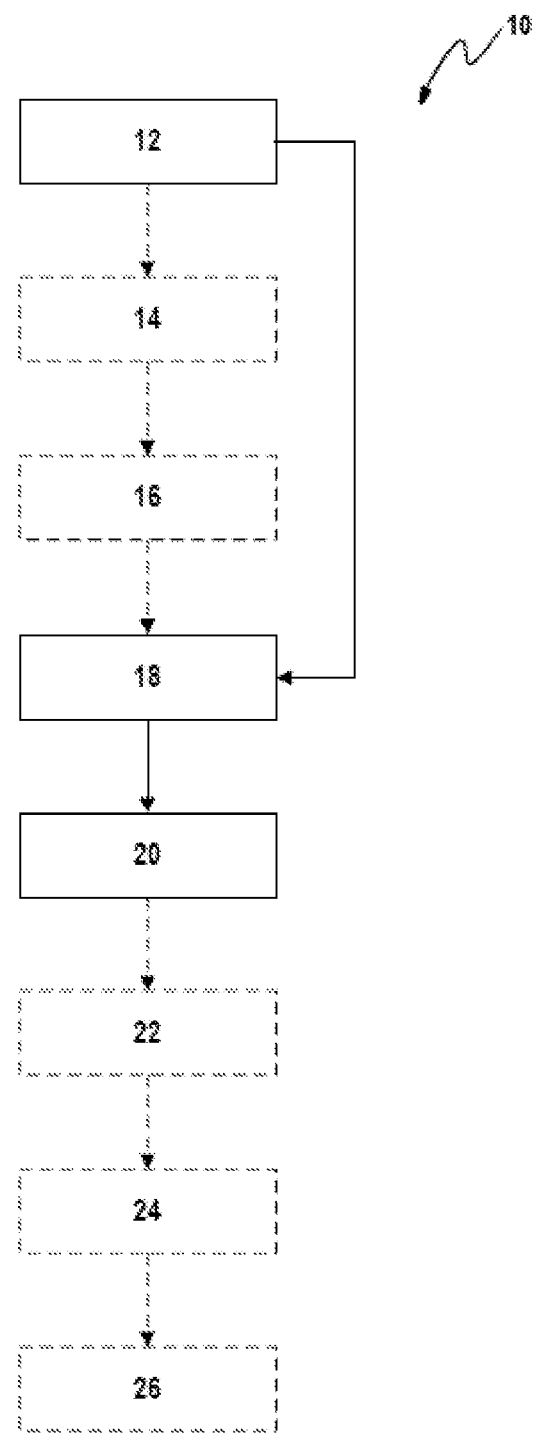
FIG. 1 is a block diagram showing a method for manufacturing a paneled structure according to certain variations of the present technology.
Figure 2:
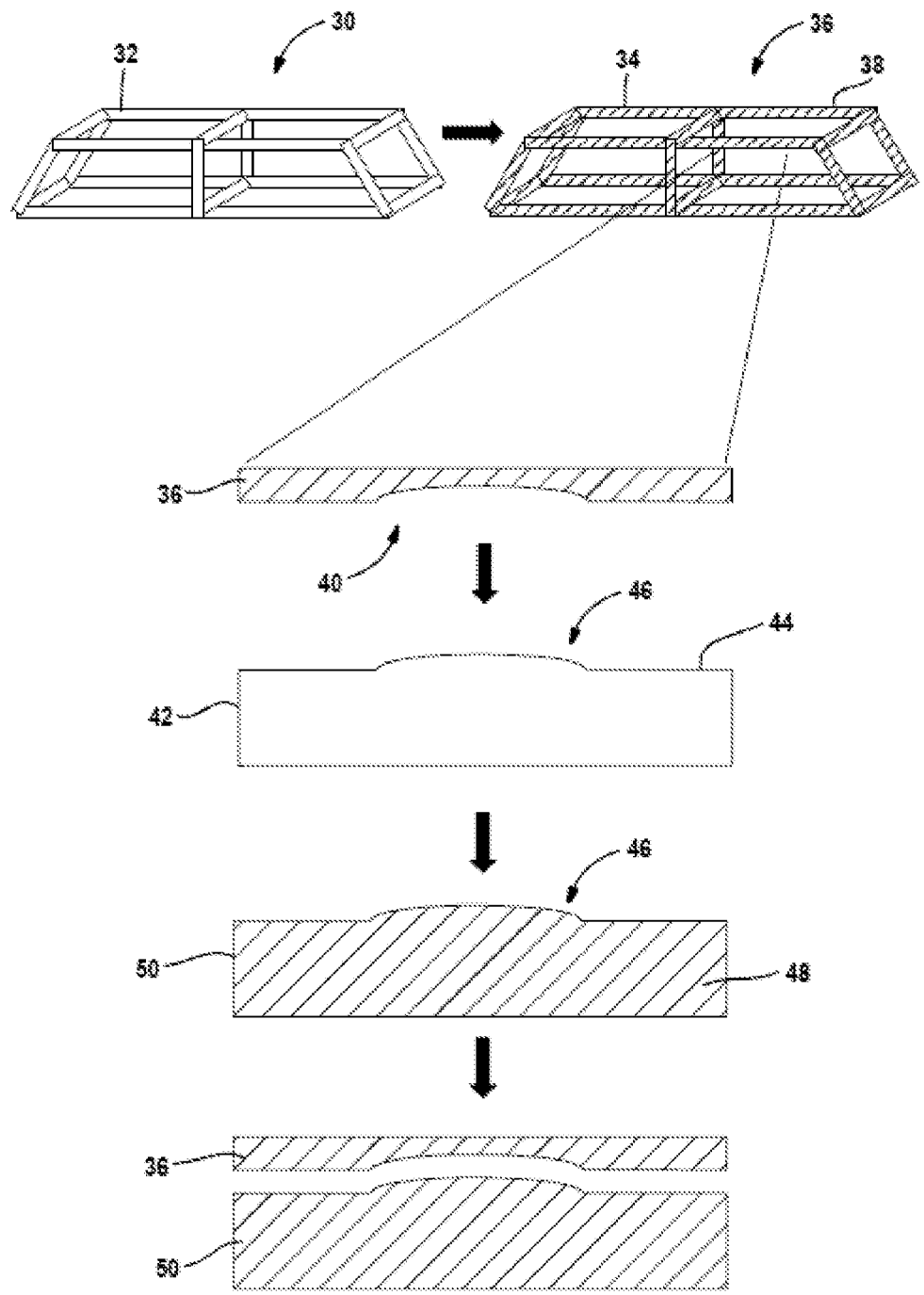
FIG. 2 is a schematic illustration of the method described in FIG. 1.

As shown in FIGS. 1 and 2, the current technology provides a method 10 for manufacturing a paneled structure. The paneled structure can be any structure as described above, including a vehicle by way of non-limiting example. In block 12, the method includes generating a frame structure or frame structure, such as, for example, a space frame or a tube frame. As used herein, a "space frame" is rigid structure comprising a plurality of interlocking struts that form a geometric pattern. A "tube frame" is a space frame wherein the struts are constructed as tubes. An exemplary frame structure or inner frame structure 30 comprising a plurality of struts 32 is shown in FIG. 2. In various embodiments, the inner frame structure 30 is generated layer-by-layer by additive manufacturing, also referred to herein as three-dimensional printing (3-D printing"). The inner frame structure 30 can be made of any material used in the art, such as, for example, plastic, fiber glass, or metal. Non-limiting examples of fibers that are suitable for reinforcing the material include carbon fibers, glass fibers (such as fiber glass or quartz), aramid fibers (such as KEVLAR® para-aramid synthetic fiber and TWARON® para-aramid synthetic fiber), boron fibers, ceramic fibers, polyester fibers, ultra-high molecular weight polyethylene (UHMWPE) fibers, and combinations thereof. After the fibers are in position, 3-D printing resumes. By this method, a 3-D printed frame structure can comprise a plurality of reinforcement layers, which provides additional strength to the frame structure.

In certain variations, the reinforcing material is a reinforcing composite pre-preg material having reinforcing fibers. A pre-preg may be a tape or strip of material comprising a plurality of fibers distributed within a resin positioned on an exposed layer's surface. The fibers can be aligned, randomly dispersed, or geometrically dispersed as a lattice structure. Positioning the tape or resin may also be performed by 3-D printing. For example, after a layer or predetermined number of layers of the material have been deposited by 3-D printing, a tape or resin comprising a plurality of fibers is positioned on an exposed layer's surface.

Figure 3:
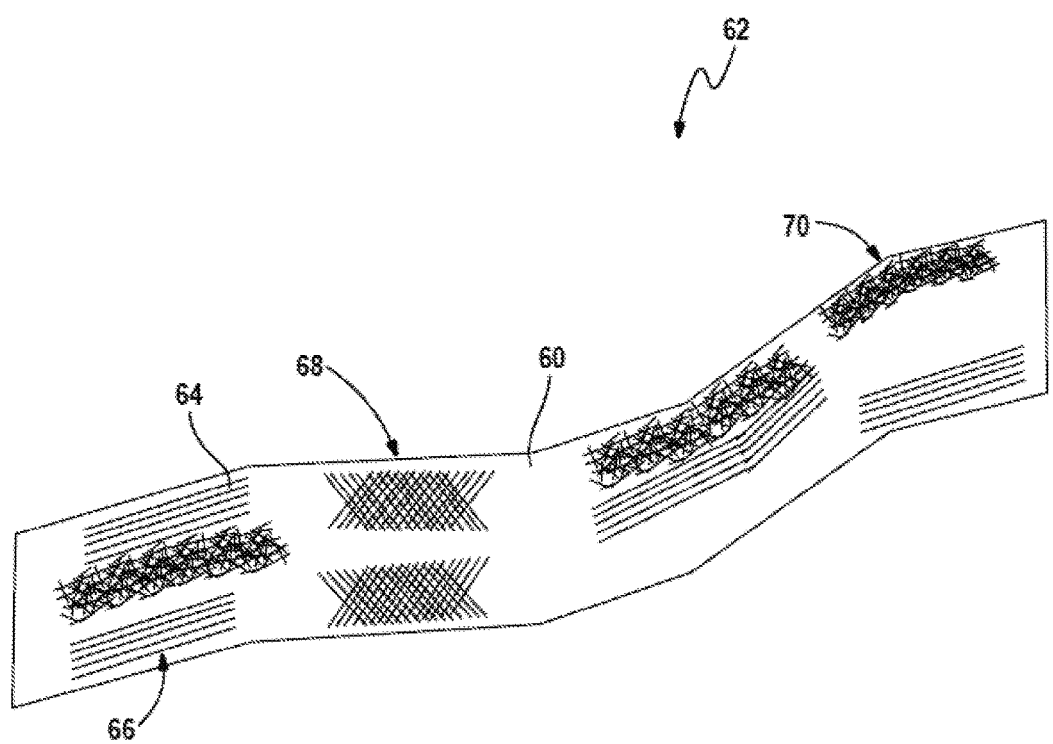
FIG. 3 is an illustration of a reinforcing material that includes a resin and fibers formed in accordance with certain aspects of the present technology.

In block 14 of FIG. 1, and as shown in FIG. 2, the method 10 includes applying a reinforcing material 34 to the entire frame structure 30 or a portion of the frame structure 30. In various embodiments, applying a reinforcing material 34 includes coating an entire outer surface of the frame structure 30 or a portion of the outer surface of the frame structure 30 with the reinforcing material 34. With reference to FIG. 3, the reinforcing material 34 can be a resin matrix 60 configured as a tape 62 that comprises reinforcing fibers 64. The reinforcing fibers 64 can include any fibers described herein. In some embodiments, the method 10 includes aligning chopped or continuous fibers 64 in a predetermined orientation, which is dependent on a location of the frame structure 30 to be coated. The resin matrix 60 of FIG. 3 includes continuous fibers 64 in an aligned orientation 66, fibers 64 in a crossing orientation or weaves 68, and chopped fibers 64 in a random orientation 70. These predetermined orientations 66, 68, 70 are used to optimize the strength of the frame structure 30 for load or performance requirements. For example, continuous fibers 64 in an aligned orientation 66 provide strength when a load is applied to a location of the frame structure 30 in the direction of the fibers. In regard to a vehicle's space frame, continuous fibers 64 can be used in A-pillars (in a direction from a vehicle's front hood to the vehicle's roof) or B-pillars (in a direction from a vehicle's floor to the vehicle's roof). A crossing orientation 68 or random orientation 70 may be used in a location where it may be expected that a load will be applied orthogonal to a strut or tube. Accordingly, these fiber architectures provide frame structures that are completely customizable.

In block 16, after the reinforcing material 34 has been coated onto the frame structure 30, the method 10 includes treating the reinforcing material 34 to generate a reinforced frame structure 36 that has an outer surface 38. In various embodiments, treating includes curing or solidifying the reinforcing material 34 under pressure, wherein the pressure is associated with local vacuum bagging, hydro-static pressure, a pneumatically pressurized sleeve, or an autoclave. The resulting reinforced frame structure 36 has increased strength relative to the frame structure 30 that is not at least partially coated with a reinforcing material 34. However, in some embodiments, the frame structure 30 has a sufficient strength such that applying the reinforcing material 34 and treating the reinforcement material 34 are not necessary in blocks 14 and 16 of FIG. 1.

In block 18, the method 10 includes scanning the reinforced frame structure 36, or the outer surface of 38 of the reinforced frame structure 36, to determine if the outer surface 38 of the reinforced frame structure 36 has more than a nominal surface deviation at a location where a panel will be disposed. In embodiments where the frame structure 30 has a sufficient strength such that applying the reinforcing material 34 and treating the reinforcement material 34 are not necessary, block 18 includes scanning the frame structure 30 to determine if it has an outer surface that has more than a nominal surface deviation at a first region where a panel will be disposed. As used herein, a "nominal surface deviation" refers to a deviation of a structure's outer surface that does not affect a panel's ability to be assembled to the structure at the location of the nominal surface deviation. For example, a surface deviation that is not nominal may lead to a poor fit between a panel and the frame structure 30 or between adjacent panels. Such a poor fit could be manifested as unsightly gaps between panels, design lines in panels that are shifted from panel to panel, and/or closure panels, such as doors, deck lids, hoods, etc., that do not fit properly within the frame structure 30 (such as closure panels that interfere with each other or another panel or gaps that form between panels or closure panels). Small surface deviations may create issues in the perceived visual quality of a structure, such as a vehicle, and larger deviations may cause problems with assembling panels to the frame structure 30. In some embodiments, a surface deviation in a surface of a frame structure that is more than a nominal surface deviation (e.g., an unacceptably high or abnormal surface deviation) is equal to or greater than about 1 mm, optionally equal to or greater than about 1.5 mm, optionally equal to or greater than about 2 mm, optionally equal to or greater than about 2.5 mm, or optionally equal to or greater than about 3 mm in certain aspects. Accordingly, when a frame structure 36 has more than a nominal surface deviation, such a pit, groove, divot, or crater, a panel disposed at the location where there is an unacceptably high surface deviation will not fit to the frame structure 36 as well as it would if the nominal surface deviation was not present or was corrected. Similarly, when a frame structure 36 has more than a nominal surface deviation, such as a hill, peak, or mound, a panel disposed at the region of the more than nominal surface deviation will not fit to the reinforced frame structure 36 in a correct orientation. Therefore, scanning the reinforced frame structure 36 provides a three-dimensional map of the frame structure's outer surface 38. In other words, scanning provides information about the surface topology of the outer surface 38 of the reinforced frame structure 36. FIG. 2 provides an exploded view of a region of the reinforced frame structure 36 having a more than nominal surface deviation 40, which is in the form of a pit or crater, wherein a panel will be disposed.

With reference to FIGS. 1 and 2, in block 20, the method 10 includes generating a panel 42 to be disposed along the first region of the reinforced frame structure 36. As used herein, a "panel" refers to either a fixed panel that forms a static exterior surface of the paneled structure or a closure panel that forms a panel that is moveable (such as by swinging) relative to the frame structure 30 or reinforced frame structure 36, such as, for example, doors, hoods, lift gates, deck lids, and the like. Accordingly, the method 10 further includes comparing the first region of the scanned outer surface 38 of the frame structure 30 or reinforced frame structure 36 to a second region of a complementary panel 42 to determine if the outer surface 38 of the frame structure 30 or reinforced frame structure 36 has more than a nominal surface deviation at a location where the first region and the second region will be joined. When the reinforced frame structure 36 includes a deviation 40 that is more than nominal, the panel 42 comprises a corrective component, such as an engagement surface 44 that is complimentary to the surface deviation 40 of the reinforced frame structure 36. The panel 42 can be generally formed using computer modeling based on the 3-D surface map of the reinforced frame structure 36 generated from scanning. The panel 42 can have a three-dimensional engagement feature 46 that is complementary and made to conformingly contact or engage the reinforced frame structure 36 at the site of the surface deviation 40. In some embodiments, the panel 42 can further have a three-dimensional engagement surface 44 that is a mirror image or negative of the surface deviation 40. The three-dimensional engagement surface 44 is complementary to and made to conformingly contact, engage, or nest on the first region of the outer surface 38 of the reinforced frame structure 36. Thus, the panel 42 can be configured to fit at only one position of the outer surface 38. In other words, the panel 42 is generated to tailor fit or adapt to the frame structure 30 or the reinforced frame structure 36 at a specific location.

In various embodiments, generating the panel 42 is performed by 3-D printing or by molding. When the panel 42 is generated via additive manufacturing, i.e., 3-D printing, the panel is generated with the corrective component, i.e., the engagement surface 44 that is complimentary to the surface deviation 40 of the reinforced frame structure 36. When the panel 42 is generated by molding, the panel may not have the engagement surface 44 incorporated therein. Therefore, in some embodiments generating the panel 42 comprises generating a corrective component or the engagement surface 44, that is complimentary to the surface deviation 40 of the reinforced frame structure 36 by additive manufacturing, i.e., 3-D printing, onto the panel 42.

In block 22, the method 10 includes apply a reinforcing material 48 to at least the engagement surface 44 of the panel 42. In some embodiments, the entire panel 42 or a portion of the panel 42 is coated with the reinforcing material 48. The reinforcing material 48 can be any reinforcing material described herein. In various embodiments, the reinforcing material 48 coated onto the panel 42 is the same reinforcing material 34 coated onto the frame structure 30. Accordingly, the reinforcing material 48 can be applied to the panel 42 such that reinforcing fibers are aligned in a predetermined orientation as described above with reference to FIG. 3. Moreover, in block 24, the method 10 comprises treating the reinforcing material 48 to generate a reinforced panel 50. Treating can be performed as described above in regard to treating the coated outer surface 38 of the reinforced frame structure 36.

Figure 4:
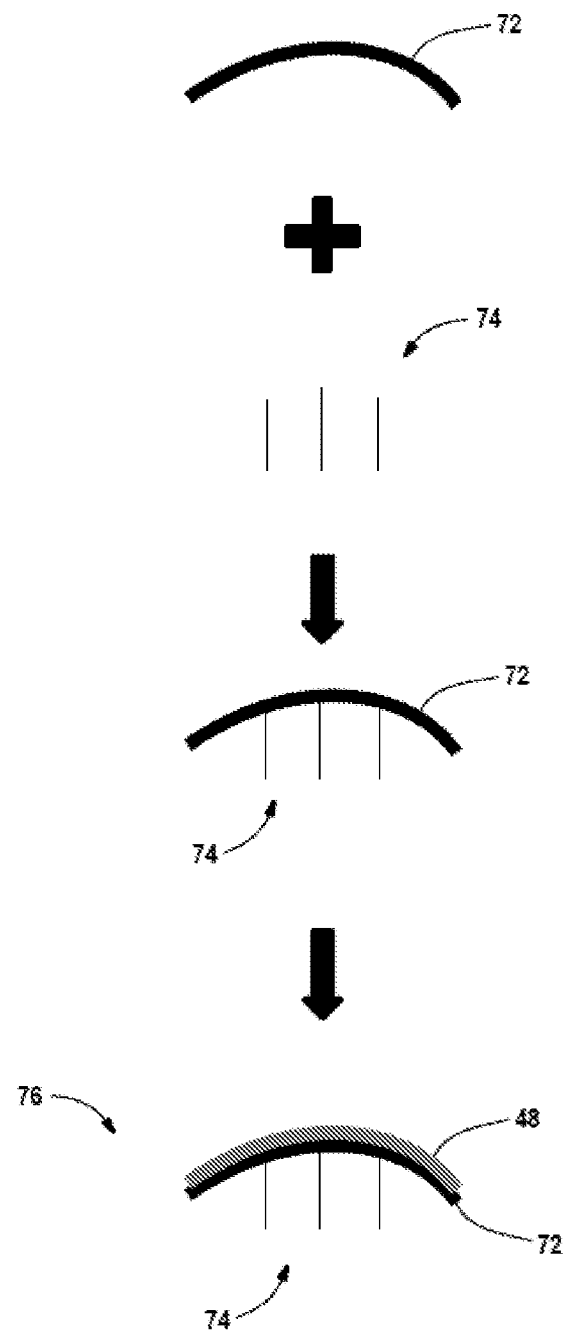
FIG. 4 is an illustration of a device and method that may be used for generating a panel and applying a reinforcing material to the panel.

FIG. 4 is an illustration of a device and method that may be used for generating the panel 42 and applying the reinforcing material 48 to the panel 42. After scanning, an inner surface 72 of the panel 42 is generated by additive manufacturing, such as by 3-D printing, based on the 3-D surface map of the frame structure 30 or reinforced frame structure 36 generated from scanning. The inner surface 72 comprises the three-dimensional engagement feature 46 or the three-dimensional engagement surface 44. A device comprising a plurality of programmably actuated pins 74 is operated to arrange and adjust the pins 74 in the shape of the inner surface 72 of the panel 42. The inner surface 42 is then laid onto the pins. While the inner surface 42 is supported by the pins 74, the reinforcing material 48 is applied to the inner surface 72 to generate a reinforced inner surface 76. The reinforcing material 48 is subjected to pressure as described above. The pins 74 hold the inner surface 72 so that the inner surface 72 is supported adequately when the reinforcing material 48 is applied to the inner surface 72 and while the reinforcing material 48 is treated with pressure.

With further reference to FIGS. 1 and 2, in block 24, the method 10 includes further processing the reinforced frame structure 36 and/or the reinforced panel 50. In various embodiments, further processing includes disposing the reinforced panel 50 onto the reinforced frame structure 36, such as by assembling the reinforced panel 50 to the first region of the outer surface 38 of the frame structure 30 or reinforced frame structure 36 to form the paneled structure. For example, in some embodiments the reinforced panel 50 is adhered to the reinforced frame structure 36 with an adhesive or otherwise coupled to the reinforced frame structure 36, such as, for example, by screws, bolts, rivets, etc. In other embodiments, the panel 50 is coupled to the reinforced frame structure 36 by a hinge or other hardware that allows the panel to swing relative to the frame structure 30 or reinforced frame structure 36. Further processing can also include applying a clear coat and/or paint to the reinforced frame structure 36 and/or reinforced panel 50, either prior to the reinforced panel 50 being disposed on the reinforced frame structure 36 or after the reinforced panel 50 is disposed on the reinforced frame structure 36.

Figure 5:
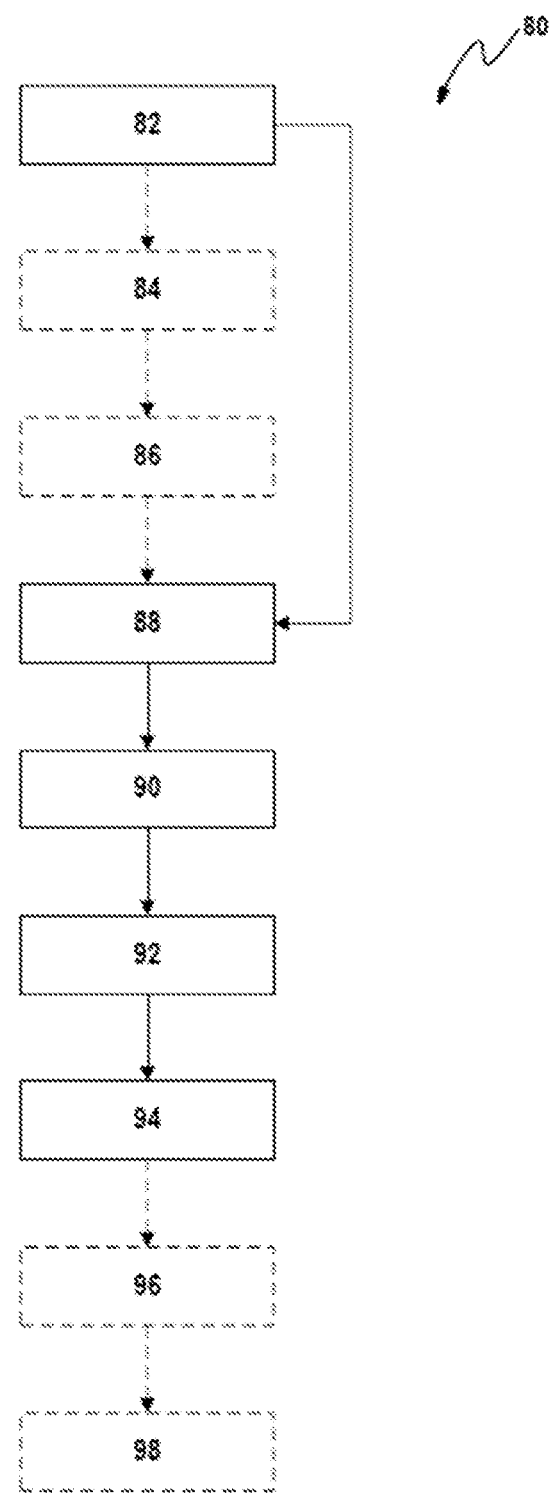
FIG. 5 is a block diagram showing a second method for manufacturing a paneled structure according to certain variations of the present technology.
Figure 6:
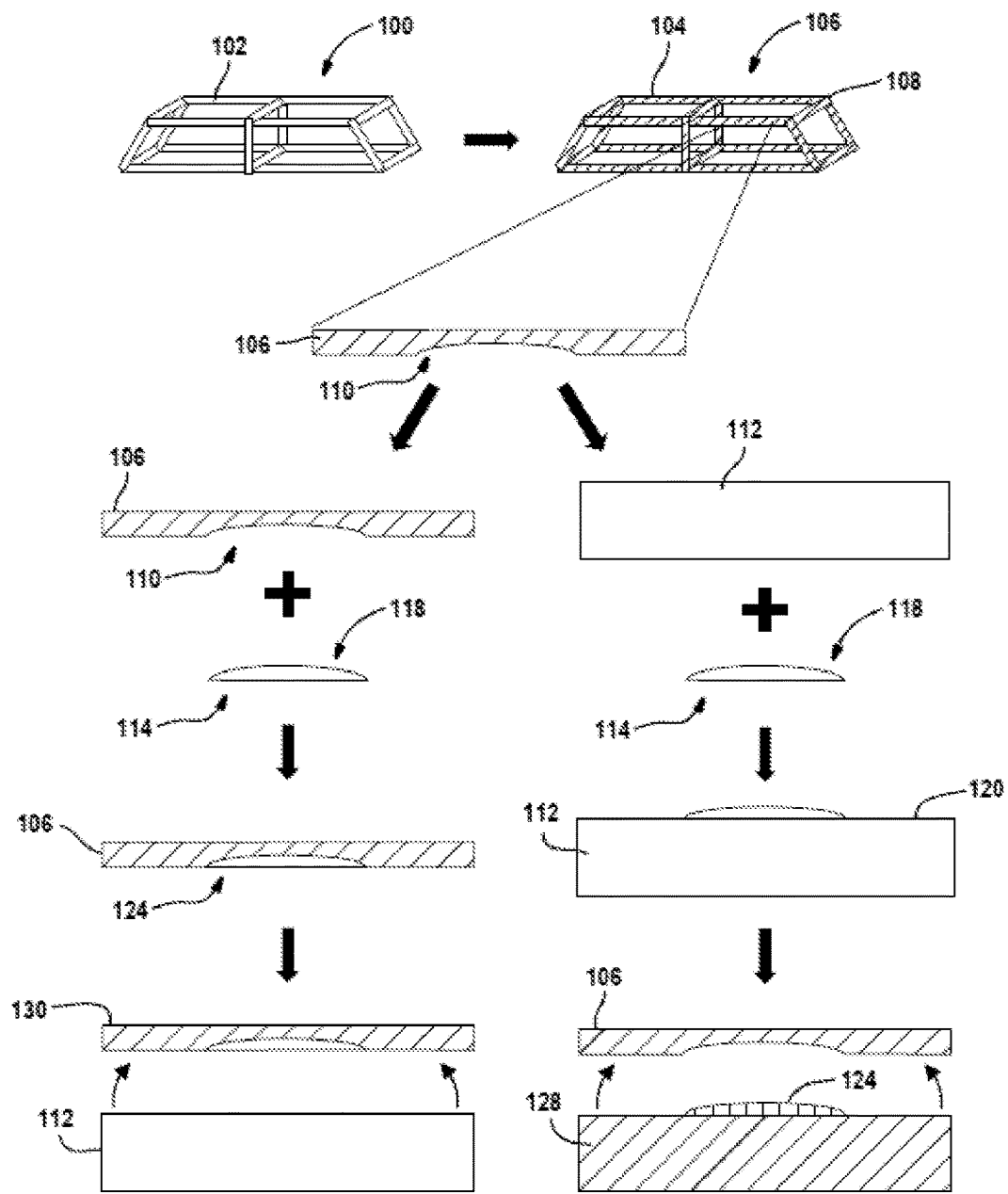
FIG. 6 is a schematic illustration of the method described in FIG. 4.

As shown in FIG. 5, and with reference to the illustrations in FIG. 6, the current technology provides another method 80 for manufacturing a paneled structure. The paneled structure can be any structure as described above, including a vehicle by way of non-limiting example. In block 82, the method includes generating a frame structure or inner frame structure, such as, for example, a space frame or a tube frame. As used herein, a "space frame" is rigid structure comprising a plurality of interlocking struts that form a geometric pattern. A "tube frame" is a space frame wherein the struts are constructed as tubes. An exemplary frame structure or inner frame structure 100 comprising a plurality of struts 102 is shown in FIG. 6. In various embodiments, the inner frame structure 100 is generated layer-by-layer by three-dimensional printing (3-D printing"). The inner frame structure 100 can be made of any material used in the art, such as, for example, plastic, fiber glass, or metal. In some embodiments, the material is reinforced with a reinforcing fiber. For example, after a layer or predetermined number of layers of the material have been deposited by 3-D printing, a tape or resin comprising a plurality of fibers is positioned on an exposed layer's surface. Non-limiting examples of fibers that are suitable for reinforcing the material include carbon fibers, glass fibers (such as fiber glass or quartz), aramid fibers (such as KEVLAR® para-aramid synthetic fiber and TWARON® para-aramid synthetic fiber), boron fibers, ceramic fibers, polyester fibers, ultra-high molecular weight polyethylene (UHMWPE) fibers, and combinations thereof. After the fibers are in position, 3-D printing resumes. By this method, a 3-D printed frame structure can comprise a plurality of reinforcement layers, which provides additional strength to the frame structure.

In block 84 of FIG. 5, and as shown in FIG. 6, the method 80 includes applying a reinforcing material 104 to the entire frame structure 100 or a portion of the frame structure 100. In various embodiments, applying a reinforcing material 104 includes coating an entire outer surface of the frame structure 100 or a portion of the outer surface of the frame structure 100 with the reinforcing material 104. With reference to FIG. 3, the reinforcing material 34 can be a resin matrix 60 configured as a tape 62 that comprises reinforcing fibers 64. The reinforcing fibers 64 can include any fibers described herein. In some embodiments, the method 10 includes aligning chopped or continuous fibers 64 in a predetermined orientation, which is dependent on a location of the frame structure 100 to be coated. The resin matrix 60 of FIG. 3 includes continuous fibers 64 in an aligned orientation 66, fibers 64 in a crossing orientation or weaves 68, and chopped fibers 64 in a random orientation 70. These predetermined orientations 66, 68, 70 are used to optimize the strength of the frame structure 100 for load or performance requirements. For example, continuous fibers 64 in an aligned orientation 66 provide strength when a load is applied to a location of the frame structure 100 in the direction of the fibers. In regard to a vehicle's space frame, continuous fibers 64 can be used in A-pillars (in a direction from a vehicle's front hood to the vehicle's roof) or B-pillars (in a direction from a vehicle's floor to the vehicle's roof). A crossing orientation 68 or random orientation 70 may be used in a location where it may be expected that a load will be applied orthogonal to a strut or tube. Accordingly, these fiber architectures provide frame structures that are completely customizable.

In block 86, after the reinforcing material 104 has been coated onto the frame structure 100, the method 80 includes treating the reinforcing material 104 to generate a reinforced frame structure 106 that has an outer surface 108. In various embodiments, treating includes curing or solidifying the reinforcing material 104 under pressure, wherein the pressure is associated with local vacuum bagging, hydro-static pressure, a pneumatically pressurized sleeve, or an autoclave. The resulting reinforced frame structure 106 has increased strength relative to the frame structure 100 that is not at least partially coated with a reinforcing material 104. However, in some embodiments, the frame structure 100 has a sufficient strength such that applying the reinforcing material 104 and treating the reinforcement material 104 are not necessary in blocks 84 and 86 of FIG. 5.

In block 88, the method 80 includes scanning the reinforced frame structure 106, or the outer surface of 108 of the reinforced frame structure 106, to determine if the outer surface 108 of the reinforced frame structure 106 has more than a nominal surface deviation, as defined above, at a location where a panel will be disposed. Scanning the reinforced frame structure 106 provides a three-dimensional map of the frame structure's outer surface 108. In other words, scanning provides information about the surface topology of the outer surface 108 of the reinforced frame structure 106. In embodiments where the frame structure 100 has a sufficient strength such that coating with the reinforcing material 34 and treating the reinforcement material 104 are not necessary, block 88 includes scanning the frame structure 100 to determine if it has an outer surface that has more than a nominal surface deviation at a first region where a panel will be disposed. FIG. 6 provides an exploded view of a location of the reinforced frame structure 106 having a more than nominal surface deviation 110, which is in the form of a pit or crater.

With reference to FIGS. 5 and 6, in block 90, the method 80 includes generating a panel 112 with a predetermined shape to be disposed onto the reinforced frame structure 106. In various embodiments, the panel 112 is generated via additive manufacturing, i.e., 3-D printing, or by molding.

When, after scanning, it is determined that there is more than a nominal surface deviation at the location where the panel is to be disposed, in block 92 the method 80 further comprises generating a corrective component 114. Accordingly, the method 80 further includes comparing the first region of the scanned outer surface 108 of the frame structure 100 or reinforced frame structure 106 to a second region of a complementary panel 112 to determine if the outer surface 108 of the frame structure 100 or reinforced frame structure 106 has more than a nominal surface deviation at a location where the first region and the second region will be joined In some embodiments, generating a corrective component 114 comprises generating a wedge 118 by additive manufacturing, i.e., 3-D printing, wherein the wedge conformingly contacts and engages with the surface deviation 110. Therefore, the method 80 includes generating a corrective component 114 to be disposed at the location if the first region of the outer surface 108 of the frame structure 100 or reinforced frame structure 106 has more than a nominal surface deviation from the second region, wherein the corrective component 114 comprises an engagement surface that is complimentary to the first region and the second region.

After generating the corrective component 114, in block 94 the method 80 comprises coupling the corrective component 114 to either the panel 112 (see the right branch of FIG. 6) or to the reinforced frame structure 106 (see the left branch of FIG. 6). Then, in block 96, the method 80 comprises applying a reinforcing material 124 to at least a surface 120 of the panel 112 comprising the corrective component 114 or an exposed surface 122 of the corrective component 114 of the reinforced frame structure 106. In block 98, the method 80 comprises treating the reinforcing material 124 to generate a reinforced panel with a corrected engagement surface 128 or a reinforced frame structure with a cured surface deviation 130. Treating can be performed as described above. Accordingly, the method 80 includes assembling the corrective component 114 between the first region of the outer surface 108 of the frame structure 100 or reinforced frame structure 106 and the second region of the complementary panel 112 to form the paneled structure. In some embodiments, assembling comprises first coupling the corrective component 114 to the complementary panel 112 to form a corrected engagement surface on the complementary panel 112 corresponding to the second region, and then coupling the first region of the frame structure 100 or reinforced frame structure 106 to the corrective component 114 and the complementary panel 112 so that the corrected engagement surface conformingly contacts and engages with the first region of the outer surface 108 of the frame structure 100 or reinforced frame structure 106 at the location. In other embodiments, assembling comprises first coupling the corrective component 114 to the outer surface 108 of the frame structure 100 or reinforced frame structure 106 to form a corrected engagement surface on the frame structure 100 or reinforced frame structure 106 corresponding to the first region, and then coupling the second region of the complementary panel 112 to the corrective component 114 and the frame structure 100 or reinforced frame structure 106 so that the corrected engagement surface conformingly contacts and engages with the second region of the complementary panel 112 at the location.

For example, in the right branch of FIG. 6, the wedge 118 is positioned on the panel 112. The wedge 118 is then coated with the reinforcing material 124. The reinforcing material 124 is then treated to generate the reinforced panel with a corrected engagement surface 128. The reinforced panel with a corrected engagement surface 128 can then be coupled to the reinforced frame structure 106. Here, further processing can include applying a clear coat and/or paint to the reinforced panel with a corrected engagement surface 128 and/or to the reinforced frame structure 106, either prior to or after the reinforced panel with a corrected engagement surface 128 is disposed on the reinforced frame structure 106.

In the left branch of FIG. 6, the wedge 118 is positioned on a surface of the reinforced frame structure 106 that comprises the surface deviation 110. The wedge 118 is then coated with the reinforcing material 124, which is then treated to generate the reinforced frame structure with a cured surface deviation 130. Here, the panel 112, can optionally be coated with the reinforcing material 134, treated, and adhered or coupled to the reinforced frame structure with a cured surface deviation 130. Here, further processing can include applying a clear coat and/or paint to the panel 112 and/or to the reinforced frame structure with a cured surface deviation 130, either prior to or after the panel 112 is disposed on the reinforced frame structure with a cured surface deviation 130.

Figure 7:
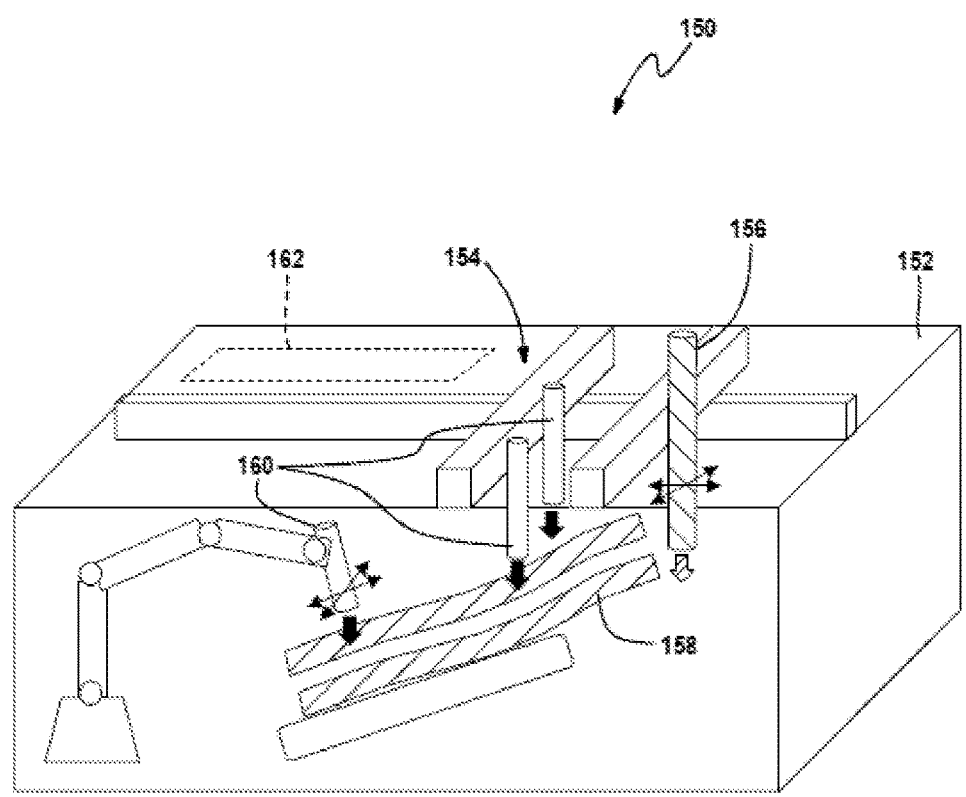
FIG. 7 is an illustration of a device for generating a reinforcing material formed in accordance with certain aspects of the present technology.
Figure 8:
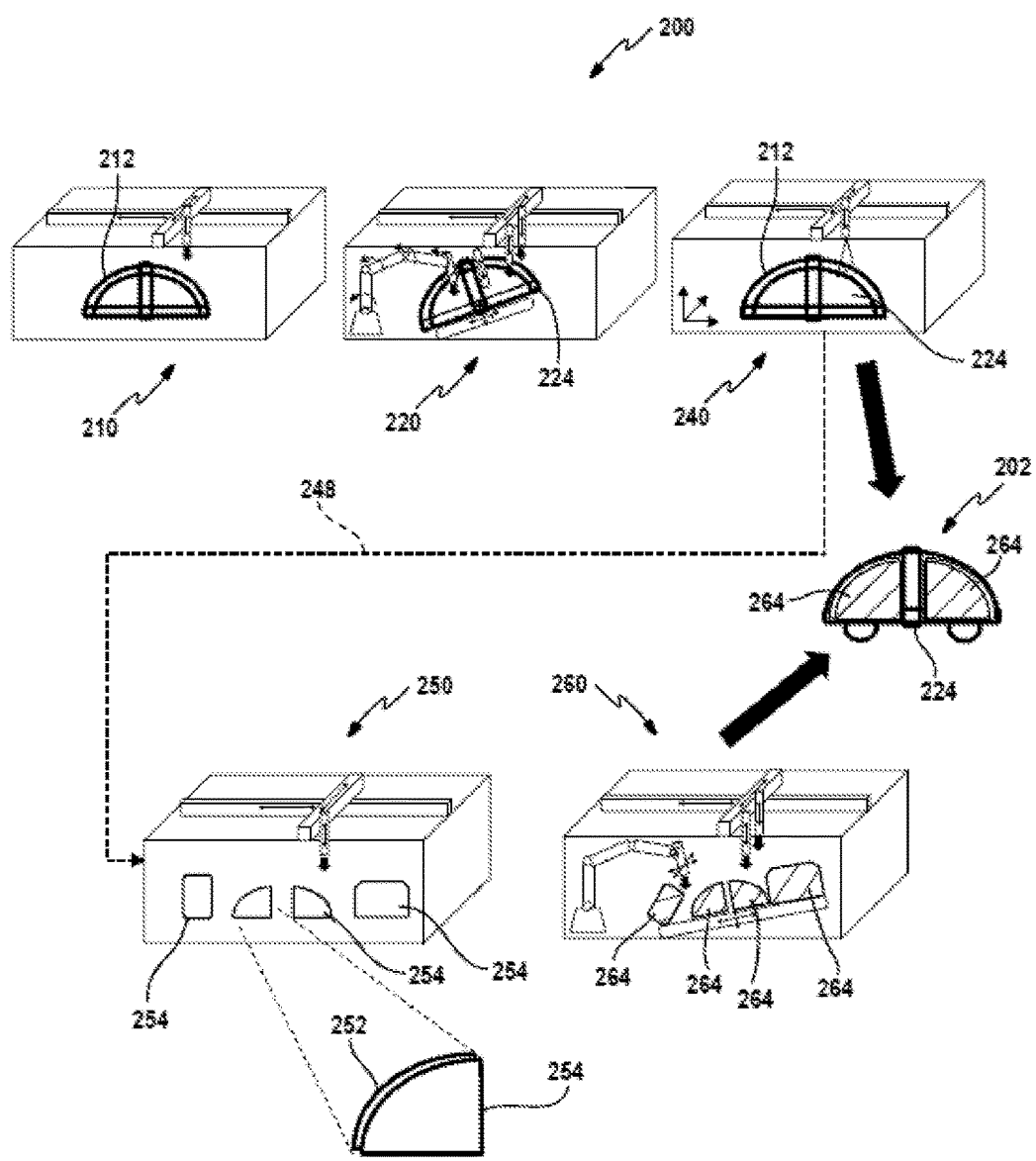
FIG. 8 is an illustration of a serial process for manufacturing a paneled structure according to certain variations of the present technology.
Figure 9:
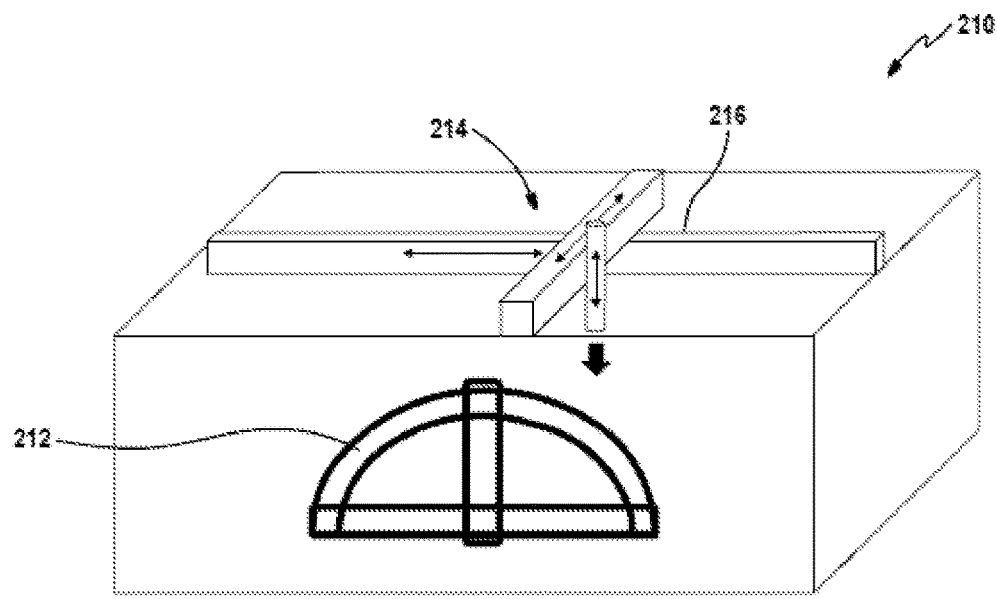
FIG. 9 is an illustration of a device for printing a frame structure according to certain variations of the present technology.

With reference to FIG. 7, the present technology also provides a device or system 150 for generating a reinforcing material. The device 150 includes a housing 152. Within the housing 152 is a track system 154. The device 150 also includes a printing head 156 for depositing a resin 158 in a predetermined shape and a fiber head 160 for depositing fibers onto the resin 158. The track system 154 independently moves the printing head 156 and the fiber head 160 in three dimensions. In various embodiments, the device 150 includes at least one printing head 156 and/or at least one fiber head 160. For example, the device 150 of FIG. 7 includes one printing head 156 and three fiber heads.

In some embodiments, the device 150 further comprises an optional scanning system 162 comprising stereo vision sensors and at least one camera. The scanning system 162 generates a three-dimensional map of a surface of a structure. Accordingly, the device 150 is used to scan structures, generate a map of the structure's surface, and generate a reinforcing material for applying onto the structure.

The device 150 generates custom resins comprising reinforcing fibers. Accordingly, the device 150 can be used to generate the reinforcing materials describe herein, such as the reinforcing material 34 described with reference to FIG. 3. In various embodiments, the device 150 comprises a plurality of printing heads 156. Accordingly, the device 150 can be used to perform the methods described herein. For example, the device 150 can be used to scan a frame structure, print a panel with a three-dimensional engagement feature, generate a reinforcing material, and coat the frame structure and/or panel with the reinforcing material.

With reference to FIGS. 8-13, the present technology also provides a serial process 200 for manufacturing a paneled structure 202. The serial process 200, for example, can be used to execute the method 10 of FIG. 1 or the method 80 of FIG. 5. The serial process 200 includes operating a first printing device 210, shown in greater detail in FIG. 9, for generating a frame structure 212 by 3-D printing. The first printing device 210 comprises a track system 214 that is operable to move a printing head 216 in three dimensions. In various embodiments, the first printing device 210 comprises at least one printing head 216, i.e., a plurality of printing heads 216. As the tack system 214 moves, the printing head 216 deposits a material such that the frame structure 212 is formed. As described above, the frame structure 212 can be a space frame or a tube frame.

Figure 10:
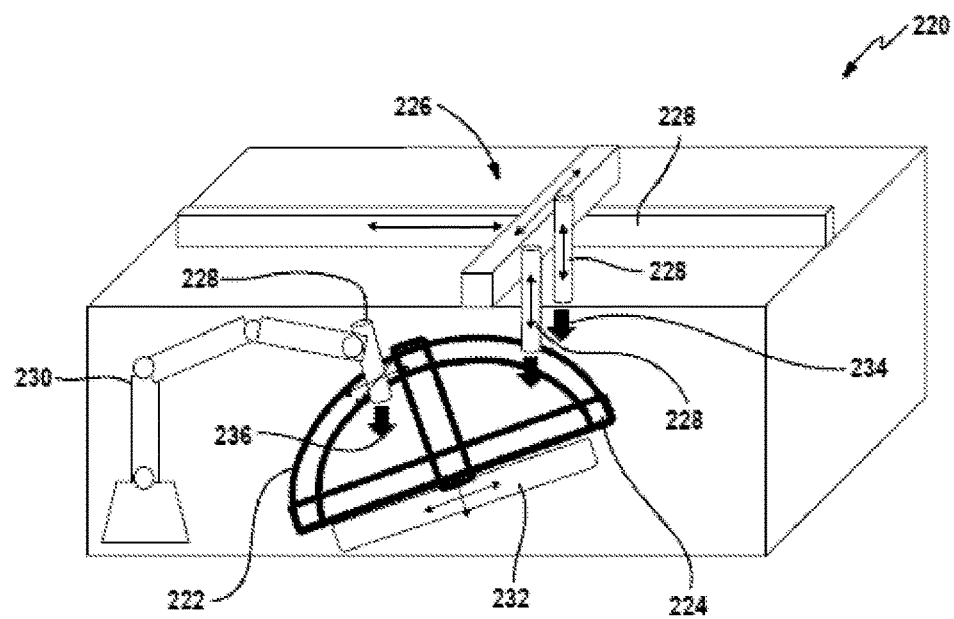
FIG. 10 is an illustration of a device for coating a frame structure with a reinforcing material according to certain variations of the present technology.

Unless the frame structure 212 is printed with a sufficient strength, the serial process 200 then includes operating a first coating device 220, shown in greater detail in FIG. 10, for applying a reinforcing material 222 to the frame structure 212 to form a reinforced frame structure 224. The first coating device 220 comprises a track system 226 that is operable to move at least one printing head 228 in three dimensions, at least one robotic arm 230 that is operable to move at least one printing head 228 in three dimensions or both the track system 226 and the at least one robotic arm 228. As shown in FIG. 10, the first coating device 220 comprises both the track system 226 and the robotic arm 228, and further comprises three printing heads 228. The first coating device 220 also comprises a multi-axis build platform or stage 232, on which the fame structure 212 is positioned. The stage 232 is operable to slide and tilt in three dimensions to position the frame structure 212 disposed thereon relative to the print heads 228. Accordingly, the track system 226 and robotic arm 230 can position the print heads 228 relative to the frame structure 212 such that the print heads deposit a reinforcing material about the frame structure 212 to form the reinforced frame structure 224. In some embodiments, at least one print head 228 deposits a resin 234 about the frame structure 212 and at least one print head 228 deposits a plurality of fibers 236 on the resin to generate the reinforcing material 222 on the frame structure 212. As discussed above, the plurality of fibers 236 can be deposited on the resin 234 in a predetermined orientation depending on the location of the frame structure 212 where the reinforcing material 222 is deposited. Moreover, the plurality of fibers 236 can comprise any fiber described herein.

Figure 11:
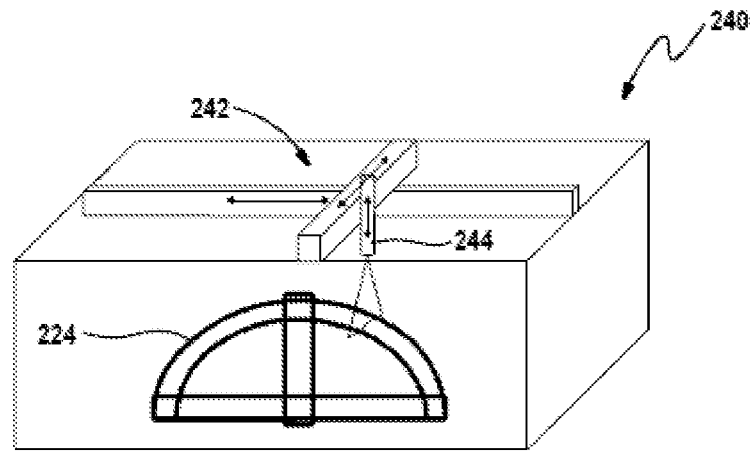
FIG. 11 is an illustration of a device for scanning a structure according to certain aspects of the present technology.

After the reinforced frame structure 224 is made, the serial process 200 includes operating a scanning device 240, shown in greater detail in FIG. 11, for scanning the reinforced frame structure 224, or the frame structure 212 when it has sufficient strength (nonetheless, further processing of the reinforced frame structure 224 is further described), to determine if the reinforced frame structure 224 has an outer surface with more than a nominal surface deviation at a location where a panel will be disposed. The scanning device 240 comprises a track system 242 that is operable to move at least one scanner 244 in three dimensions relative to the reinforced frame structure 224 to survey the reinforced frame structure's surface and develop a three-dimensional map of its surface geometry. The scanner 244 comprises at least one sensor and optionally at least one camera. Non-limiting examples of sensors include a stereo vision sensor, a laser triangulation sensor employing a point laser or line laser, or a mechanical touch probe sensor, such as a coordinate measurement machine (CMM). The sensor is configured to capture three-dimensional point cloud data for developing the three-dimensional map.

Figure 12:
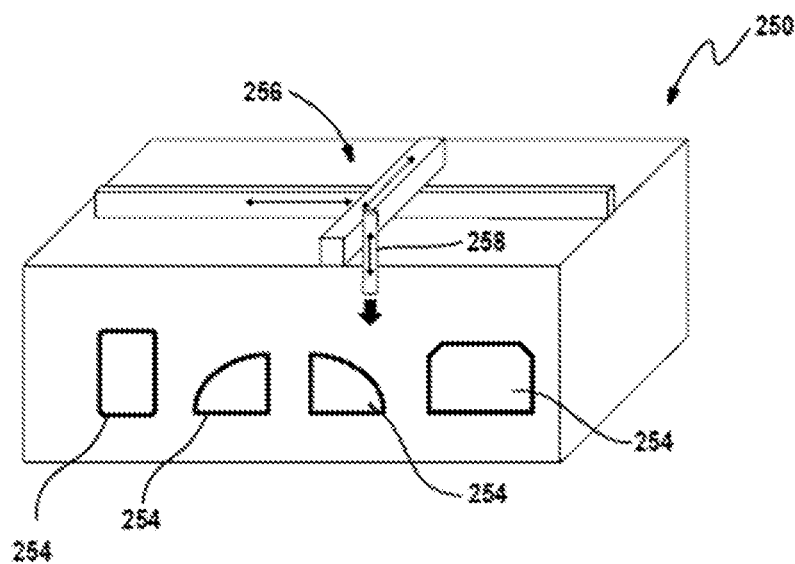
FIG. 12 is an illustration of a device for printing panels in accordance with certain aspects of the present technology.

After scanning, the serial process 200 includes operating a second printing device 250, shown in greater detail in FIG. 12, for printing a surface 252 onto a panel 254, wherein the surface 252 will be disposed on the reinforced frame structure 224. The panel 254 can be made by any means known in the art as described above. However, in one embodiment, the panel 254 is generated by three-dimensional printing in the second printing device 250. In particular, a data transfer module or device 248 transfers data from the scanning device 240 to the second printing device 250 such that the surface 252 printed onto the panel 254 will provide an engagement surface that is complimentary to the surface deviation of the reinforced frame structure 224. The second printing device 250 comprises a track system 256 that is operable to move at least one printing head 258 in three dimensions to print the panel 254 with the surface 252 or to print the surface 252 on the panel 254 made by another process. As shown in FIG. 12, the second scanning device 250 can accommodate a plurality of preformed panels 254 and print surfaces 252 on the plurality of preformed panels. In some embodiments, the second printing device 250 prints a plurality of panels 254 with surfaces 252 that will be disposed on the reinforced frame structure 224. In some embodiments, the second printing device 250 and the first printing device 210 are the same device.

Figure 13:
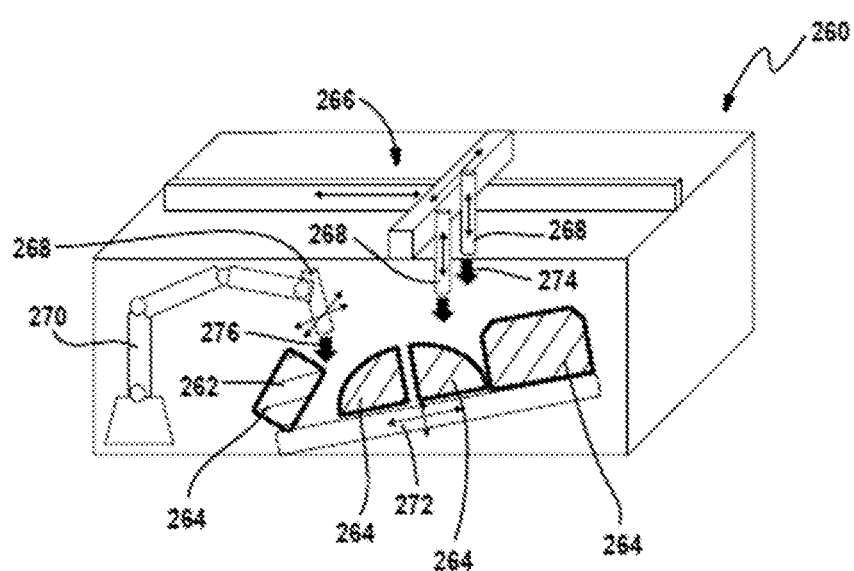
FIG. 13 is an illustration of a device for coating a panel with a reinforcing material according to certain variations of the present technology.

Next, the serial process 200 includes operating a second coating device 260, shown in greater detail in FIG. 13, for applying a reinforcing material 262 to at least one surface of the panel 254 to form a reinforced panel 264. The second coating device 260 comprises a track system 266 that is operable to move at least one printing head 268 in three dimensions, at least one robotic arm 270 that is operable to move at least one printing head 268 in three dimensions or both the track system 266 and the at least one robotic arm 270. As shown in FIG. 13, the second coating device 260 comprises both the track system 266 and the robotic arm 270, and further comprises three printing heads 268. The second coating device 260 also comprises a multi-axis build platform or stage 272, on which the fame structure panel 254 is positioned. The stage 272 is operable to slide and tilt in three dimensions to position the panel 254 disposed thereon relative to the print heads 268. Accordingly, the track system 266 and robotic arm 270 can position the print heads 268 relative to the panel 254 such that the print heads 268 deposit a reinforcing material about the panel 254 to form the reinforced panel 264. In some embodiments, at least one print head 268 deposits a resin 274 about the panel 254 and at least one print head 268 deposits a plurality of fibers 276 on the resin 274 to generate the reinforcing material 262 on panel 254. As discussed above, the plurality of fibers 276 can be deposited on the resin 274 in a predetermined orientation depending on the location of the panel 254 where the reinforcing material 262 is deposited. Moreover, the plurality of fibers 276 can comprise any fiber described herein. In various embodiments, the second coating device 260 and the first coating device 220 are the same device.

After the reinforced panels 264 are generated, the serial process 200 includes disposing the reinforced panels 264 onto the reinforced frame structure 224, such that the surface 252 of the reinforced panel 264 engages with and conformingly contacts or nests with the surface deviation.

Various components of the devices 210, 220, 240, 250, 260 described in regard to the serial process 200 may be combined into multifunctional devices. The multifunctional devices occupy less space than the collective devices 210, 220, 240, 250, 260 and generate structures in less time relative to the time required to make the structures with the individual devices 210, 220, 240, 250, 260. These multifunctional devices are described in more detail below in regard to parallel process for manufacturing a paneled structure. However, it is understood that any combination of the devices may be employed in a single device, such that the description below is not limiting.

Figure 14:
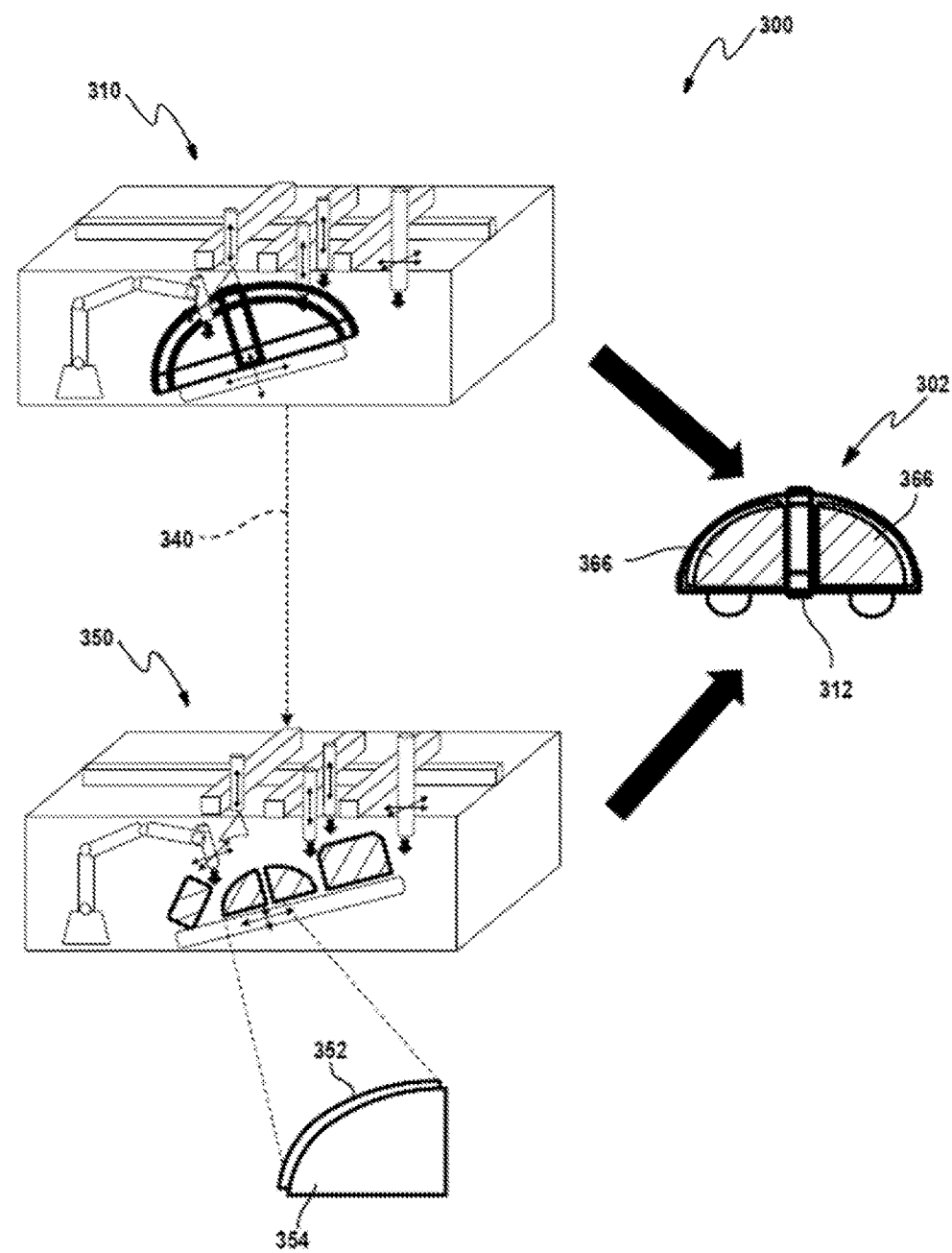
FIG. 14 is an illustration of a parallel process for manufacturing a paneled structure in accordance with certain aspects of the present technology.

With reference to FIGS. 14-16, the present technology also provides a parallel process, or "all-in-one" process 300 for manufacturing a paneled structure 302. The serial process 300, for example, can be used to execute the method 10 of FIG. 1 or the method 80 of FIG. 5. The serial process 300 includes operating a first manufacturing device 310, shown in greater detail in FIG. 15, for generating a reinforced frame structure 312. The first manufacturing device 310 comprises a track system 314 that is operable to move a printing head 316 in three dimensions. In various embodiments, the first manufacturing device 310 comprises at least one printing head 316, i.e., a plurality of printing heads 316. As the tack system 314 moves, the printing head 316 deposits a material such that a frame structure 318 is formed. As described above, the frame structure 318 can be a space frame or a tube frame.

The first manufacturing device 310 also comprises at least one coat printing head 320 associated with the track system 314 that is capable of moving the coat printing head 320 in three dimensions, at least one robotic arm 322 that is operable to move at least one coat printing head 320 in three dimensions, or both the coat printing head 320 associated with the track system 314 and the printing head 320 associated with the robotic arm 322. The coat printing head 320 coats the frame structure 318 with a reinforcing material 324 to form the reinforced frame structure 312. However, it is understood that the frame structure 318 does not need to be coated with the reinforcing material 324 if the frame structure 318 is printed with a sufficient strength.

The first manufacturing device 310 also comprises a multi-axis build platform or stage 326, on which the frame structure 318 is printed and positioned. The stage 326 is operable to slide and tilt in three dimensions to position the frame structure 318 disposed thereon relative to the coat print heads 320. Accordingly, the track system 314 and robotic arm 322 can position the print heads 320 relative to the frame structure 318 such that the coat print heads 320 deposit the reinforcing material 324 about the frame structure 318 to form the reinforced frame structure 312. In some embodiments, at least one coat print head 320 deposits a resin 328 about the frame structure 318 and at least one print head 320 deposits a plurality of fibers 330 on the resin 328 to generate the reinforcing material 324 on the frame structure 318. As discussed above, the plurality of fibers 330 can be deposited on the resin 328 in a predetermined orientation depending on the location of the frame structure 318 where the reinforcing material 324 is deposited. Moreover, the plurality of fibers 330 can comprise any fiber described herein.

The first manufacturing device 310 also comprises at least one scanner 332 for scanning the reinforced frame structure 312 to determine if the reinforced frame structure 312 has an outer surface with more than a nominal surface deviation at a location where a panel or closure will be disposed. The at least one scanner 332 is associated with the track system 314, which is operable to move the at least one scanner 332 in three dimensions relative to the reinforced frame structure 312 to survey the reinforced frame structure's surface and develop a three-dimensional map of its surface geometry. The at least one scanner 332 comprises at least one sensor and optionally at least one camera. Non-limiting examples of sensors include a stereo vision sensor, a laser triangulation sensor employing a point laser or line laser, or a mechanical touch probe sensor, such as a coordinate measurement machine (CMM). The sensor is configured to capture three-dimensional point cloud data for developing the three-dimensional map.

After scanning, the parallel process 300 includes operating a second manufacturing device 350, shown in greater detail in FIG. 16, for printing a surface 352 onto a panel or closure 354, wherein the surface 352 will be disposed on the reinforced frame structure 312. The panel or closure 354 can be made by any means known in the art as described above. However, in one embodiment, the panel or closure 354 is generated by three-dimensional printing in the second manufacturing device 350. In particular, a data transfer module or device 340 transfers data from the scanner 332 to the second manufacturing device 350 such that the surface 352 printed onto the panel or closure 354 will provide an engagement surface that is complimentary to the surface deviation of the reinforced frame structure 312.

The second manufacturing device 350 comprises a track system 356 that is operable to move at least one printing head 358 in three dimensions to print the panel or closure 354 with the surface 352 or to print the surface 352 on the panel or closure 354 made by another process. As shown in FIG. 16, the second manufacturing device 350 can accommodate a plurality of preformed panels or closures 354 and print surfaces 352 on the plurality of preformed panels. In some embodiments, the second manufacturing device 350 prints a plurality of panels or closures 354 with surfaces 352 that will be disposed on the reinforced frame structure 312.

The second manufacturing device 350 also comprises at least one coat printing head 360 associated with the track system 356 that is capable of moving the at least one coat printing head 360 in three dimensions, at least one robotic arm 362 that is operable to move at least one coat printing head 360 in three dimensions, or both the coat printing head 360 associated with the track system 356 and the printing head 360 associated with the robotic arm 362. The coat printing head 360 coats at least one surface of the panel or closure 354 with a reinforcing material 364 to form a reinforced panel or closure 366.

The second manufacturing device 350 also comprises a multi-axis build platform or stage 368, on which the panel or closure 354 is printed and/or positioned. The stage 368 is operable to slide and tilt in three dimensions to position the panel or closure 354 disposed thereon relative to the coat print heads 360. Accordingly, the track system 356 and robotic arm 362 can position the print heads 360 relative to the panel or closure 354 such that the coat print heads 360 deposit the reinforcing material 364 about the panel or closure 354 to form the reinforced panel or closure 366. In some embodiments, at least one coat print head 360 deposits a resin 370 about the panel or closure 354 and at least one print head 360 deposits a plurality of fibers 372 on the resin 370 to generate the reinforcing material 364 on the panel or closure 354. As discussed above, the plurality of fibers 372 can be deposited on the resin 370 in a predetermined orientation depending on the location of the panel or closure 354 where the reinforcing material 364 is deposited. Moreover, the plurality of fibers 372 can comprise any fiber described herein.

The second manufacturing device 350 also optionally comprises at least one scanner 374 for scanning the reinforced panel or closure 366 to generate a surface map of the reinforced panel or closure 366. The at least one scanner 374 is associated with the track system 356, which is operable to move the at least one scanner 374 in three dimensions relative to the reinforced panel or closure 366 to survey the reinforced panel's or closure's surface and develop a three-dimensional map of its surface geometry. The at least one scanner 374 comprises at least one sensor and optionally at least one camera. Non-limiting examples of sensors include a stereo vision sensor, a laser triangulation sensor employing a point laser or line laser, or a mechanical touch probe sensor, such as a coordinate measurement machine (CMM). The sensor is configured to capture three-dimensional point cloud data for developing the three-dimensional map After the reinforced panels or closure 366 are generated, the parallel process 300 includes disposing the reinforced panels or closure 366 onto the reinforced frame structure 312, such that the surface 352 of the reinforced panels or closure 366 engages with and conformingly contacts or nests with the surface deviation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a paneled structure, the method comprising:
   scanning an outer surface of a space frame structure to create a three dimensional map of the outer surface corresponding to a first region where a vehicle body panel will be disposed and identifying a surface deviation in the first region from the three dimensional map;
   generating the vehicle body panel via additive manufacturing to be disposed along the first region of the outer surface of the space frame structure based on the three dimensional map, wherein the vehicle body panel comprises an engagement feature that is complementary to the surface deviation in the first region of the outer surface of the space frame structure; and
   assembling the vehicle body panel to the first region of the outer surface of the space frame structure to form the paneled structure, in which the engagement feature of the vehicle body panel conformingly contacts the surface deviation.

2. The method according to claim 1, further comprising applying a reinforcing material to the space frame structure having the outer surface by additive manufacturing before the scanning.

3. The method according to claim 1, further comprising coating the space frame structure with a reinforcing material prior to the scanning.

4. The method according to claim 3, wherein the coating of the space frame structure with a reinforcing material comprises coating the space frame structure with fibers selected from the group consisting of carbon fibers, glass fibers, aramid fibers, boron fibers, ceramic fibers, polyester fibers, ultra-high molecular weight polyethylene (UHMWPE) fibers, and combinations thereof.

5. The method according to claim 4, wherein the coating of the space frame structure with fibers comprises aligning the fibers in a predetermined orientation.

6. The method according to claim 3, further comprising curing or solidifying the reinforcing material under pressure, wherein the pressure is associated with local vacuum bagging, hydro-static pressure, a pneumatically pressurized sleeve, or an autoclave.

7. The method according to claim 1, further comprising coating a surface of the vehicle body panel with a reinforcing material.

8. The method according to claim 1, wherein generating the vehicle body panel comprises:
    generating an inner surface of the vehicle body panel;
    laying the inner surface on a plurality of pins that are arranged and adjusted to the shape of the inner surface;
    applying a reinforcing material to the inner surface; and
    subjecting the inner surface and reinforcing material to pressure while the inner surface with the reinforcing material is supported by the plurality of pins.

9. A method for manufacturing a paneled structure, the method comprising:
    scanning an outer surface of a space frame structure;
    comparing a first region of the scanned outer surface of the space frame structure to a second region of a complementary vehicle body panel and determining that the outer surface of the space frame structure has a surface deviation at a location where the first region and the second region will be joined;
    generating a corrective component to be disposed at the location, wherein the corrective component comprises an engagement surface that is complimentary to the first region and the second region;
    coupling the corrective component to the complementary vehicle body panel to form a corrected complementary vehicle body panel having a corrected engagement surface at the second region;
    coating an entirety of the corrected complementary vehicle body panel with a reinforcing material; and
    coupling the corrected complementary vehicle body panel to the space frame structure, such that the corrected engagement surface of the corrected complementary panel conformingly contacts and engages with the deviation at the first region of the outer surface of the space frame structure at the location.

10. The method according to claim 9, wherein at least one of the space frame structure and the complementary vehicle body panel is generated by additive manufacturing.

11. The method according to claim 10, wherein the space frame structure and the corrected complementary vehicle body panel are coated with reinforcing fibers selected from the group consisting of carbon fibers, glass fibers, aramid fibers, boron fibers, ceramic fibers, polyester fibers, ultra-high molecular weight polyethylene (UHMWPE) fibers, and combinations thereof.

12. The method according to claim 11, wherein the reinforcing fibers are embedded within a resin matrix.

13. The method according to claim 9, wherein the generating of the corrective component comprises generating a wedge by additive manufacturing, wherein the wedge conformingly contacts and engages with the first region and the second region.

14. The method according to claim 1, wherein the generating the vehicle body panel via additive manufacturing comprises generating the vehicle body panel via 3-dimensional printing.

\* \* \* \* \*